United States Patent [19]

Lorimor et al.

[11] Patent Number: 5,033,608
[45] Date of Patent: Jul. 23, 1991

[54] SCREW CONVEYOR

[75] Inventors: Gary D. Lorimor; Thomas E. Wildy, both of Omaha, Nebr.

[73] Assignee: Henningsen Foods, Inc., Omaha, Nebr.

[21] Appl. No.: 497,567

[22] Filed: Mar. 22, 1990

[51] Int. Cl.$^5$ ............................................ B65G 33/24
[52] U.S. Cl. .................................. 198/674; 198/677
[58] Field of Search ............... 198/657, 672, 674, 677; 407/331, 335, 341, 380

[56] References Cited

U.S. PATENT DOCUMENTS

| 256,728 | 4/1882 | Palmer | 198/672 X |
|---|---|---|---|
| 665,262 | 1/1901 | Peck | 198/677 X |
| 894,500 | 7/1908 | Hitchon | 403/341 X |
| 1,226,475 | 5/1917 | Deck | 403/335 |
| 1,922,023 | 8/1933 | Baer | 198/674 |
| 2,334,449 | 11/1943 | Strait | 403/331 |
| 2,441,100 | 5/1948 | Marsden | 198/674 X |
| 2,524,948 | 10/1950 | Whitney | 198/672 |
| 2,720,765 | 10/1955 | Drexler | 403/335 X |
| 2,812,054 | 11/1957 | Dorris et al. | 198/674 |
| 3,272,317 | 9/1966 | Kelly | 198/672 X |
| 3,278,001 | 10/1966 | Andrews | 198/672 |
| 3,289,819 | 12/1966 | Steinmetz | 403/331 X |
| 3,730,332 | 5/1973 | Benzon et al. | 198/672 X |
| 4,429,782 | 2/1984 | Pierson | 198/677 |
| 4,547,101 | 10/1985 | Dowdakin Sr. | 403/331 X |
| 4,896,970 | 1/1990 | Schuler | 198/672 X |

FOREIGN PATENT DOCUMENTS

| 0162417 | 7/1986 | Japan | 198/672 |
|---|---|---|---|
| 489697 | 1/1976 | U.S.S.R. | 198/677 |

Primary Examiner—D. Glenn Dayoan
Attorney, Agent, or Firm—Stoll, Previto & Hoffman

[57] ABSTRACT

A screw conveyor mechanism mounted within the trough assembly. One end of said screw conveyor is removably mounted on the trough assembly. A drive shaft is provided for rotating the screw conveyor with the drive shaft being removably connected to the outer end of the screw conveyor. The drive shaft has a drive plate and the screw conveyor has a shaft plate, both of which are provided with an interengaging removable coupling. The removable coupling is a tongue-and-groove arrangement with the tongue on one plate and the groove on the other plate. A seal in the form of an O-ring is provided between the two plates.

8 Claims, 1 Drawing Sheet

SCREW CONVEYOR

BACKGROUND

The present invention is directed to an improved screw conveyor and more particularly to an improved screw conveyor for a dried powder product, such as powdered egg white.

In spray drying of certain products, such as egg white, the dried product is moved by a screw conveyor from the drying chamber to a station where it is sifted and packaged. As the product is being conveyed by the screw conveyor, some of the product remains on the conveyor or in the trough within which the conveyor is located. This necessitates periodical removal of the screw conveyor in order to clean it and to clean out the trough.

In screw conveyors presently in use, removal of the conveyor entails disengagement of the screw conveyor from the drive mechanism. Since the present conveyors are attached to the drive mechanism by screws, bolts, etc. It is necessary to unscrew and/or unbolt the screw conveyor from the drive. The other end of the screw conveyor is usually journaled in a bearing and this, too, must be disassembled before the screw conveyor can be removed. Such unscrewing, unbolting and disengagement and the subsequent engagement, screwing and bolting require special tools, and is time consuming and expensive.

BRIEF DESCRIPTION

The present invention overcomes these drawbacks and has for one of its objects the provisions of an improved screw conveyor which may be easily removed from the trough for cleaning purposes and which may be easily replaced after cleaning.

Another object of the present invention is the provision of an improved screw conveyor in which the conveyor may be easily removed without disassembling any bolts or unscrewing any nuts and which may thereafter be replaced without reassembling any bolts or screws.

Another object of the present invention is the provision of an improved screw conveyor which may be removed from the trough and replaced without the use of special tools.

Other and further objects of the invention will be obvious upon an understanding of the illustrative embodiment about to be described, or will be indicated in the appended claims and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings forming a part of the specification wherein.

DESCRIPTION

Figure 1:
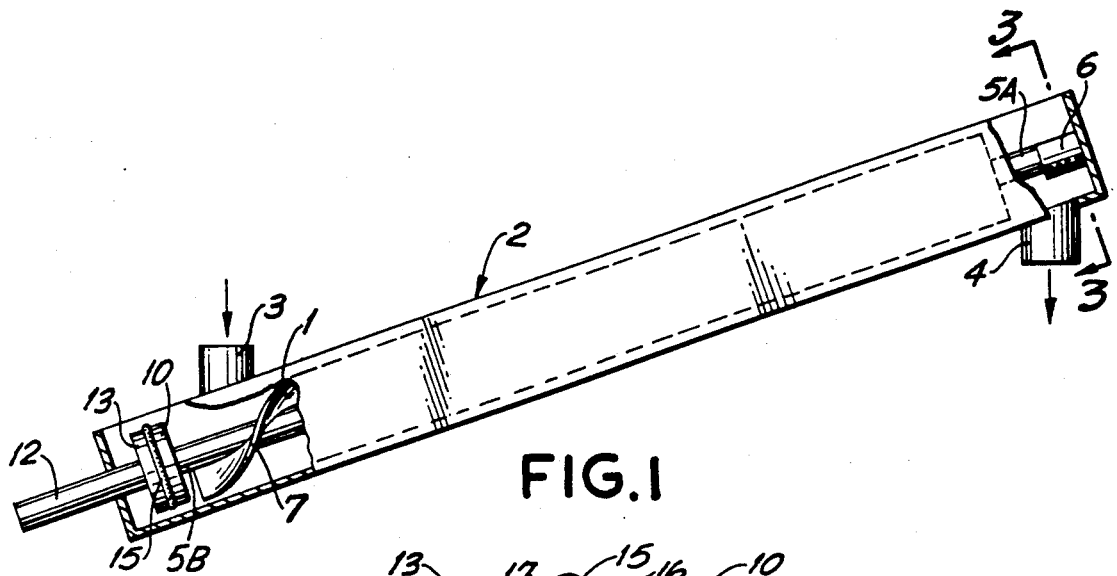
FIG. 1 is a plan view of a trough showing a screw conveyor made in accordance with the present invention.
Figure 2:
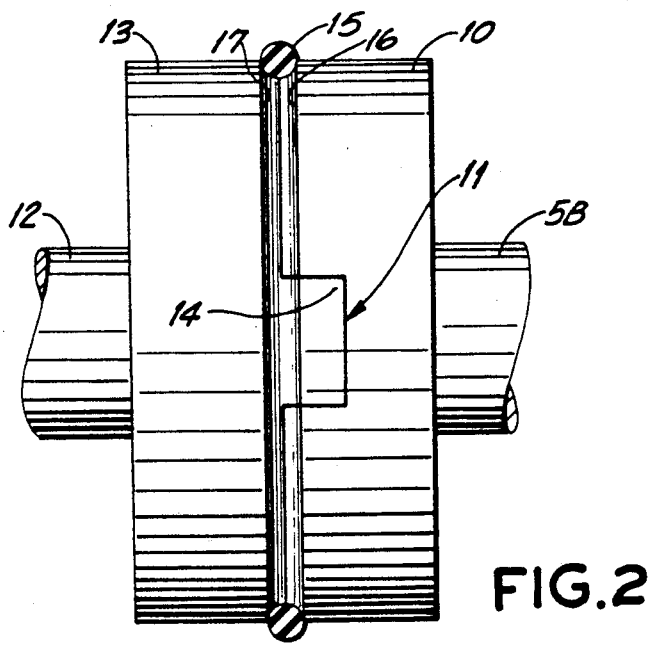
FIG. 2 is a detail showing the connection between the drive shaft and the screw conveyor shaft.
Figure 3:
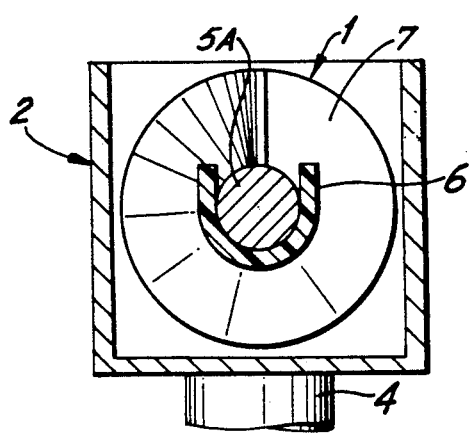
FIG. 3 is a diagrammatic view taken along line 3—3 of FIG. 2.

Referring to the drawings, the screw conveyor of the present invention comprises the usual screw 1 which is mounted within a trough 2. The trough 2 has a cover (not shown) and is inclined so that the dry product moves from a lower level to a higher level. The dried product such as powdered eggs, is supplied to the trough 2 and screw 1 through an inlet pipe 3 (which may be connected to a spray dryer). The dried product is moved upwardly by the screw 1 to an outlet 4 where it exits from the trough 2. The screw conveyor 1 is the usual screw having at least one continuous thread 7 and is mounted on a shaft 5. The upper end of the shaft 5A sits in a saddle bearing 6 shown in FIG. as being U-shaped. Preferably the saddle bearing 6 is made of nylon. It will be noted that the upper shaft end 5A may be removed from the saddle bearing 6 by merely lifting it out of the U-shaped bearing 6.

The lower end of the screw shaft 5B is connected to a shaft plate 10 having a groove 11 therein. The groove 11 is preferably elongated and extends diametrically across the entire shaft plate 10. A drive shaft 12 is also provided and connected to suitable drive means (not shown) for rotating the screw conveyor 1. The drive shaft 12 has a drive plate 13 which has a tongue 14 adapted to fit into the groove 11 of the shaft plate 10. The tongue 14 preferably extends diametrically across the entire plate 13. With this structure, the lower shaft end 5B may be easily removed by sliding the groove 11 in the shaft plate 10 along and out of the tongue 14 in drive plate 13.

An O-ring 15 is provided at the juncture between the two plates 10–13. Circumferential grooves 16–17 are provided in each plate 10–13 to receive the O-ring 15. The O-ring 15 prevents any of the powdered product from entering the interface between the two plates 10–13.

With this structure when the screw conveyor 1 is to be removed from the trough 2 for cleaning purposes, the cover (not shown) of the trough 2 is removed and the O-ring 15 is moved out of the grooves 16–17. The screw conveyor 1 is lifted out of the trough 12 by merely sliding the groove 11 of the shaft plate 10 along the tongue 14 at the drive plate 13 and lifting the upper shaft end 5A out of the saddle bearing 6. This can be done quickly and without the use of any special tools. Once the screw conveyor 1 and the trough have been cleaned, the conveyor may be easily replaced by laying the upper shaft end 5A back into the saddle bearing 6 and sliding the slot 11 in the shaft plate 10 back along the tongue 14 of the drive plate 13 and thereafter replacing the O-ring 15 in grooves 16–17.

It will thus be seen that the present invention provides an improved screw conveyor which may be easily removed from the trough for cleaning purposes and which may be easly replaced after cleaning without disassembling or reassembling any bolts or nuts and without the use of special tools.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A screw conveyor mechanism comprising a trough assembly, a screw conveyor within the trough assembly, a first end of said screw conveyor being removably mounted on said trough assembly, drive means for rotating said screw conveyor, said drive means comprising means for removably connecting the drive means to a second end of said screw conveyor, said drive means comprising a drive plate, said second end of the screw conveyor having a shaft plate, each of said plates having a face, the face of one plate facing the face of the other plate in juxtaposed interface relationship to each other, removably connecting means comprising coupling means on said two plates, said coupling means being a tongue-and-groove arrangement with the tongue being on one plate and the groove being on the other plate, both said tongue and groove extending diametrically across the faces of the plates in which they are located, and sealing means being provided in the interface between the two plates.

2. A mechanism as set forth in claim 1 wherein said sealing means comprises an O-ring.

3. A mechanism as set forth in claim 2 wherein said plates have complimentary grooves to accommodate said O-ring.

4. A mechanism as set forth in claim 3 wherein the first end of the screw conveyor is mounted in a U-shaped bearing on said trough assembly.

5. A mechanism as set forth in claim 4 wherein said bearing is a saddle bearing.

6. A screw conveyor mechanism comprising a screw conveyor having a shaft plate at one end, said shaft plate having means for removably coupling with a drive means, said removable coupling means extending across the entire width of the shaft plate, said coupling means comprising a groove extending diametrically across said shaft plate, said shaft plate having a groove to accommodate a sealing means.

7. A mechanism as set forth in claim 6 wherein said sealing means comprises an O-ring.

8. A mechanism as set forth in claim 6 wherein the second end of the screw conveyor has a shaft end adapted to be removably mounted in a support means.

* * * * *